(12) United States Patent
Liu et al.

(10) Patent No.: US 11,196,323 B2
(45) Date of Patent: Dec. 7, 2021

(54) PROGRAMMABLE MOTOR AND HOUSEHOLD APPLIANCE HAVING SAME

(71) Applicant: GUANGDONG WELLING MOTOR MANUFACTURING CO., LTD., Guangdong (CN)

(72) Inventors: Chao Liu, Guangdong (CN); Liming Gong, Guangdong (CN); Qian Zhang, Guangdong (CN); Hu Li, Guangdong (CN)

(73) Assignee: GUANGDONG WELLING MOTOR MANUFACTURING CO., LTD., Guangdon (CN)

( * ) Notice: Subject to any disclaimer, the term of this patent is extended or adjusted under 35 U.S.C. 154(b) by 141 days.

(21) Appl. No.: 16/479,020

(22) PCT Filed: Jul. 19, 2017

(86) PCT No.: PCT/CN2017/093543
§ 371 (c)(1),
(2) Date: Jul. 18, 2019

(87) PCT Pub. No.: WO2018/133350
PCT Pub. Date: Jul. 26, 2018

(65) Prior Publication Data
US 2019/0334417 A1 Oct. 31, 2019

(30) Foreign Application Priority Data

Jan. 22, 2017 (CN) .......................... 201710057058.3
Jan. 22, 2017 (CN) .......................... 201720092442.2

(51) Int. Cl.
*H02P 5/00* (2016.01)
*H02K 11/35* (2016.01)
(Continued)

(52) U.S. Cl.
CPC .......... *H02K 11/35* (2016.01); *F04D 15/0066* (2013.01); *F25B 49/025* (2013.01); *G05B 19/108* (2013.01); *F25B 2600/111* (2013.01)

(58) Field of Classification Search
CPC ...... F04D 15/00; F04D 15/0066; F04D 27/00; F25B 2600/111; F25B 49/025; G05B 19/0426; G05B 19/108; H02K 11/35
(Continued)

(56) References Cited

U.S. PATENT DOCUMENTS 8,764,472 B2   7/2014  Rassoolkhani et al.
9,937,400 B2 *  4/2018  Hart ....................... A63B 69/40
(Continued)

FOREIGN PATENT DOCUMENTS

CN    103201945 A    7/2013
CN    106787472 A    5/2017

OTHER PUBLICATIONS

International Search Report dated Oct. 26, 2017 issued in PCT/CN2017/093543.
(Continued)

*Primary Examiner* — Kawing Chan
*Assistant Examiner* — Gabriel Agared
(74) *Attorney, Agent, or Firm* — Scully Scott Murphy & Presser

(57) ABSTRACT

Provided are a programmable motor and a household appliance having the same. The programmable motor comprises a main body (21) and a driving device (22) comprising a reprogramming interface. When performing reprogramming on the programmable motor, the reprogramming interface communicates with a programming device to receive a motor parameter or a motor software program, to transmit the same to the driving device (22), and to update the motor parameter or the motor software program in the driving
(Continued)

device (22). The method realizes rewriting of a motor software program and realizes reprogramming of a motor by directly inserting a programming device into a reprogramming interface of a driving device (22) without having to disassemble the driving device (22), thereby effectively reducing post-sale costs associated with a motor, and improving post-sale efficiency associated with the motor.

7 Claims, 1 Drawing Sheet

(51) Int. Cl.
*F04D 15/00* (2006.01)
*F25B 49/02* (2006.01)
*G05B 19/10* (2006.01)

(58) Field of Classification Search
USPC .......................................................... 318/34
See application file for complete search history.

(56) References Cited

U.S. PATENT DOCUMENTS

2013/0234630 A1* 9/2013 Yang ................... H02P 23/0031
318/244
2016/0193520 A1* 7/2016 Hart .......................... F41B 3/03
124/78

OTHER PUBLICATIONS

Official Action dated Sep. 22, 2020 received in Canadian Patent Application No. CA 3,050,556.
Office Action dated Oct. 15, 2021 received in Canadian Patent Application No. CA 3,050,556.

* cited by examiner

PROGRAMMABLE MOTOR AND HOUSEHOLD APPLIANCE HAVING SAME

CROSS-REFERENCE TO RELATED APPLICATIONS

This is a national stage of International Application No. PCT/CN2017/093543, filed Jul. 19, 2017, claiming priority based on Chinese Patent Application No. 201720092442.2 filed Jan. 22, 2017 and Chinese Patent Application No. 201710057058.3 filed Jan. 22, 2017, the entire contents of each of which is incorporated herein by reference. No new matter is added.

FIELD

The present disclosure relates to a field of motor technology, and more particularly, to a programmable motor and household appliance having the same.

BACKGROUND

With the development of the air conditioning industry, the functional requirements of the fan motor are increasing, and most of these motors are controlled by software. Generally, software functions and algorithms determine the function and performance of the motor, the reliability of the software logic and the algorithms determine the operating stability of the motor to a certain extent. The software test cases may not fully reflect the actual use scenario, which in turn causes software vulnerabilities.

For the air-conditioning industry, the amount of motor used is large, and once the motors with software vulnerabilities enter the market in large quantities, it is possible to cause batch discarding of the motors.

SUMMARY

The present disclosure aims to solve at least one of the above problems to at least some extent. For this, an objective of the present disclosure is to provide a programmable motor, which can realize re-burning of a software program of a motor, and can realize reprogramming of the motor by directly inserting a programming device into a reprogramming interface of a driving device without having to disassemble the driving device, thereby effectively reducing post-sale costs associated with a motor, and improving post-sale efficiency associated with the motor.

Another objective of the present disclosure is to provide a household appliance.

In order to achieve the above objectives, embodiments of a first aspect of the present disclosure provide a programmable motor. The programmable motor includes a main body and a driving device including a reprogramming interface. When performing reprogramming on the programmable motor, the reprogramming interface is configured to communicate with a programming device to receive a motor parameter or a motor software program, to transmit the motor parameter or the motor software program to the driving device, and to update a motor parameter or a motor software program in the driving device.

With the programmable motor according to embodiments of the present disclosure, when it is required to reprogram the motor, communication with the programming device is performed through the reprogramming interface provided on the driving device to receive the motor parameter or the motor software program, the received motor parameter or the motor software program is transmitted to the driving device, and the motor parameter or the motor software program in the driving device is updated. The method realizes re-burning of the motor software program and realizes reprogramming of the motor by directly inserting the programming device into the reprogramming interface of the driving device without having to disassemble the driving device, thereby effectively reducing post-sale costs associated with a motor, and improving post-sale efficiency associated with the motor.

According to an embodiment of the present disclosure, the reprogramming interface is sealed by an insulating material when the reprogramming is not performed on the programmable motor.

According to an embodiment of the present disclosure, the reprogramming interface includes a motor parameter command interface, a software update interface, and a motor power supply interface.

According to an embodiment of the present disclosure, a voltage of the software update interface is 10 to 30V direct current (DC), and a voltage of the motor power supply interface is greater than or equal to 30V.

According to an embodiment of the present disclosure, the voltage of the software update interface and the voltage of the motor power supply interface are both provided by the programming device.

According to an embodiment of the present disclosure, the programmable motor further includes a first power source. An input end of the first power source is connected to an external power source, a first output end of the first power source is connected to the software update interface, and a second output end of the first power source is connected to the motor power supply interface. The first power source is configured to convert a voltage of the external power source into a first voltage, to output the first voltage to the software update interface to supply power for the software update interface, to convert the voltage of the external power source into a second voltage, and to output the second voltage to the motor power supply interface to supply power for the programmable motor.

According to an embodiment of the present disclosure, the external power source is an alternating current having a voltage of 208 to 230 V, or 115 V, or 460 V, and having a frequency of 50/60 Hz, or the external power source is a direct current having a voltage greater than 30V.

According to an embodiment of the present disclosure, the motor parameter includes one or more of a motor counter electromotive force, a motor rotational inertia, a motor torque, a motor steering, a motor speed, and a fan delivery.

In addition, embodiments of the present disclosure also provide a household appliance having the above-mentioned programmable motor.

With the household appliance according to embodiments of the present disclosure, it realizes re-burning of the motor software program through the above-mentioned programmable motor, and it realizes reprogramming of the motor by directly inserting the programming device into the reprogramming interface of the driving device without having to disassemble the driving device, thereby effectively reducing post-sale costs associated with a motor, and improving post-sale efficiency associated with the motor.

DETAILED DESCRIPTION

Figure 1:
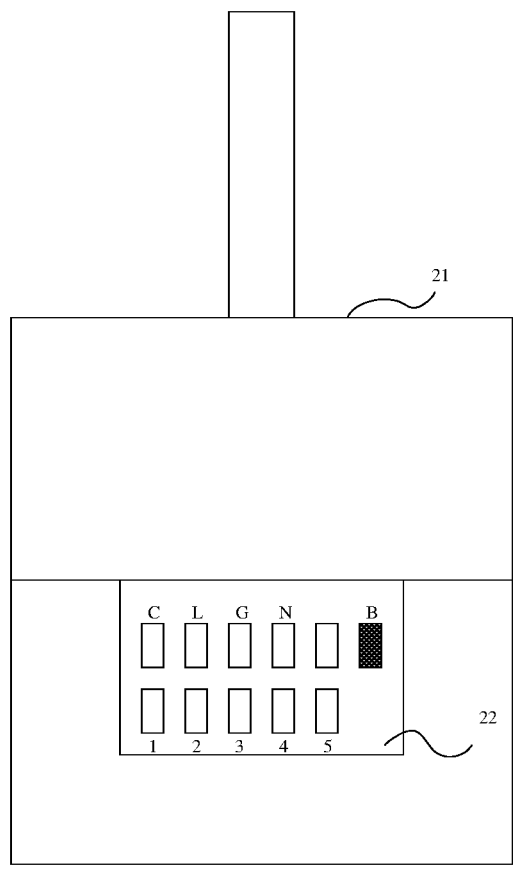
FIG. 1 is a block diagram of a programmable motor according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

A programmable motor and a household appliance having the same according to embodiments of the present disclosure will be described below with reference to the accompanying drawings.

FIG. 1 is a block diagram of a programmable motor according to an embodiment of the present disclosure. As illustrated in FIG. 1, the programmable motor includes a main body 21 and a driving device 22.

The main body 21 and the driving device 22 can be connected together by screws. The driving device 22 includes a reprogramming interface. When reprogramming the programmable motor, the reprogramming interface is configured to communicate with a programming device to receive a motor parameter or a motor software program, to transmit the received motor parameter or the motor software program to the driving device 22, and to update a motor parameter or a motor software program in the driving device 22.

In the embodiments of the disclosure, the motor parameter may include one or more of a motor counter electromotive force, a motor rotational inertia, a motor torque, a motor steering, a motor speed, and a fan delivery.

According to an embodiment of the present disclosure, the reprogramming interface is sealed by an insulating material when the reprogramming is not performed on the programmable motor.

In detail, in order to prevent large-scale motor scrapping due to motors with software vulnerabilities entering the market, a reprogramming interface can be reserved on the driving device 22. When it is required to set or modify parameters of the motor or re-program the motor software program, i.e., when the motor is reprogrammed, the motor can be reprogrammed through the reprogramming interface on the driving device 22. The motor having a reprogramming function is called a programmable motor. In this way, it can effectively prevent the motor from being directly scrapped due to software vulnerabilities, and when the reprogramming interface is disposed outside the driving device 22, the reprogramming of the motor can be realized without disassembling the driving device 22, thereby effectively reducing post-sale costs associated with the motor, and improving post-sale efficiency associated with the motor.

In detail, when the reprogramming is not performed on the motor, the reprogramming interface is in a closed state. For example, the reprogramming interface can be sealed by an insulating material, with a strong anti-interference ability, thus an error operation of reprogramming due to interference may be avoided.

When the motor is required to be reprogrammed, the reprogramming interface is turned on and connected to the programming device, thus reprogramming can be achieved. For example, when the motor parameters of the programmable motor are set or modified, the programmable motor is kept unpowered firstly, then a first end of the programming device is connected to the reprogramming interface of the programmable motor, and a second end of the programming device is connected to a USB interface of a computer, thus electrical connection between the programmable motor and the programming device is realized, and the setting and modification of the motor parameters are completed. For another example, when a software program of the programmable motor is burnt, the programmable motor is kept unpowered firstly, then a first end of the programming device is connected to the reprogramming interface of the programmable motor, and the other end of the programming device is connected to a USB interface of a computer, and finally, the programmable motor is powered. The programming device burns software codes into the driving device 22 by means of communication. Therefore, setting and modification of the motor parameters and re-burning of the motor software program can be realized, and the reprograming of the motor may be realized by directly unplugging the sealing device on the reprogramming interface and by inserting the programming device into the reprogramming interface of the driving device, without having to disassemble the driving device of the motor, thereby effectively reducing post-sale costs associated with the motor, and improving post-sale efficiency associated with the motor.

According to an embodiment of the present disclosure, as illustrated in FIG. 1, the reprogramming interface includes a motor parameter command interface, a software update interface, and a motor power supply interface.

In detail, as illustrated in FIG. 1, the reprogramming interface may include ports C, L, G, N, B, 1, 2, 3, 4, and 5. Port 1 to port 5 are the motor parameter command interfaces, port B is the software update interface, ports L and N are the motor power supply interfaces, port C is a ground terminal, also referred to as a reference terminal, and port G is a protection ground terminal. Multi-gear setting of respective motor parameters such as the motor torque (for control of constant torque), the motor speed (for control of constant speed), and the fan delivery (for control of constant air volume when the programmable motor is applied to air conditioning fans) can be realized through port 1 to port 5, the motor software can be updated through port B, and the programmable motor can be powered through ports L and N.

In the embodiments of the present disclosure, a voltage of the software update interface B may be 10 to 30V direct current (DC), and a voltage of the motor power supply interface (L, N) is greater than or equal to 30V.

According to an embodiment of the present disclosure, the voltage of the software update interface B and the voltages of the motor supply interfaces (L, N) are provided by the programming device.

In detail, when the voltage of the software update interface B is provided by the programming device, an isolated power source can be set inside the programming device to convert the voltage of the USB interface from 5 VDC to 12 VDC. When the programming device is connected to the software update interface B and when the programming device is connected to the USB interface of the computer, the isolated power source converts the voltage of the USB interface from 5V DC to 12V DC, and outputs the 12V DC to the software update interface B to supply power for the software update interface B.

When the voltages of the motor power supply interfaces (L, N) are provided by the programming device, a pump power source can be set inside the programming device to pump the 12V DC converted by the isolated power source to 30V. When the programming device is connected to the motor power supply interfaces (L, N) and when the programming device is connected to the USB interface of the computer, the isolated power source first converts the 5V DC to 12V DC, then the pump power source pumps the 12V DC to 30V, and outputs the 30V DC to the motor power supple interfaces (L, N) to power the programmable motor.

It can be understood that the voltage of the software update interface B and the voltages of the motor power supply interfaces (L, N) can also be powered by an external power source, and a corresponding conversion module is required to be set in the programmable motor.

According to an embodiment of the present disclosure, the programmable motor further includes: a first power source (not shown in the Figs). An input end of the first power source is connected to the external power source, and a first output end of the first power source is connected to the software update interface B, and a second output end of the first power source is connected to the motor power supply interface (L, N). The first power source is configured to convert a voltage of the external power supply into a first voltage and to output the first voltage to the software update interface B to supply power for the software update interface B, and to convert the voltage of the external power supply to a second voltage and to output the second voltage to the motor power supply interfaces (L, N) to supply power for the programmable motor.

It should be noted that when the voltage of the software update interface B is powered by the external power source, the port C needs to be the same level as the ground terminal (also referred to as the reference terminal) of the programming device.

According to an embodiment of the present disclosure, the external power source may be an alternating current having a voltage of 208 to 230 V, or 115 V, or 460 V, and having a frequency of 50 or 60 Hz, or the external power source may be a direct current having a voltage greater than 30V.

In order to make the present disclosure more clearly understood by those skilled in the art, the present disclosure will be further described with reference to a specific example.

Figure 2:
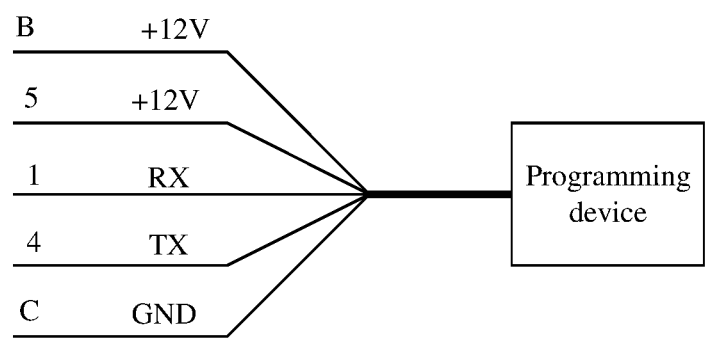
FIG. 2 is a schematic diagram illustrating connection between a programming device and a reprogramming interface of a programmable motor when the programmable motor is reprogrammed according to an embodiment of the present disclosure.

In detail, FIG. 2 is a schematic diagram illustrating connection between a programming device and a reprogramming interface of a programmable motor when the programmable motor is reprogrammed according to an embodiment of the present disclosure. As illustrated in FIGS. 1 and 2, when it is required to set and modify the parameters of the programmable motor, the programmable motor is kept unpowered firstly. Then a serial communication transmission port TX of the programming device is connected to Port 4 of the reprogramming interface of the programmable motor, a serial communication receiving port RX of the programming device is connected to Port 1 of the reprogramming interface of the programmable motor, and a DC voltage port and a common interface (+12V and GND) of the programming device are connected to port 5 and port C of the reprogramming interface of the programmable motor, and the USB interface of the programming device is connected to the USB interface of the computer, thus the electrical connection between the programming device and the programmable motor is established, and the setting and modification of the parameters of the programmable motor can be realized through the programming device.

It should be noted that ports 1 to 5 correspond to different gear positions, and multi-gear setting of torque, speed, and air delivery can be realized through reasonable allocations of ports 1 to 5.

When the software program of the programmable motor is required to be burnt, firstly, the programmable motor is kept unpowered. Then the serial communication transmission port TX of the programming device is connected to the port 4 of the reprogramming interface of the programmable motor, the serial communication receiving port RX of the programming device is connected to the port 1 of the reprogramming interface of the programmable motor, the DC voltage port and the common interface (+12V and GND) of the programming device are connected to port 5 and port C of the reprogramming interface of the programmable motor, and a power terminal (+12V) of the common interface are connected to port B of the reprogramming interface of the programmable motor. Alternatively, port B is directly powered by the external power source, at this time, it is required that a level of a ground terminal of the common interface is the same as a level of a ground terminal of the external power source. The USB interface of the programming device is connected to the USB interface of the computer. Finally, the motor power supply interface (not shown) of the programming device is connected to ports L and N of the reprogramming interface of the programmable motor to supply power for the programmable motor. Alternatively, the programmable motor is directly powered by the external power source connected to ports L and N). Thereby, burning of the software program of the programmable motor can be realized by the programming device. For example, the burning may be implemented by JTAG software or serial communication software.

During the reprogramming process, the motor can be reprogrammed by directly inserting the programming device into the reprogramming interface of the motor without having to disassemble the driving device, thereby effectively reducing post-sale costs associated with the motor, and improving post-sale efficiency associated with the motor.

In conclusion, with the programmable motor according to an embodiment of the present disclosure, when it is required to reprogram the driving device, communication with the programming device is performed through the reprogramming interface provided on the driving device to receive a new software program and to transmit it to the driving device, and the software program of the driving device is updated, thus the re-burning of the software program can be realized, and the driving device can be reprogrammed by directly inserting the programming device into the reprogramming interface of the driving device without having to disassemble the driving device, thereby effectively reducing post-sale costs associated with the motor, and improving post-sale efficiency associated with the motor.

Further, embodiments of the present disclosure also provide a household appliance having the above-described programmable motor. For example, the household appliance can be an air conditioner, and the programmable motor can be applied to a fan of the air conditioner as a brushless DC motor.

The household appliance according to embodiments of the present disclosure can realize the re-burning of the motor software program through the above-mentioned programmable motor by directly inserting the programming device into the reprogramming interface of the driving device without having to disassemble the driving device, thereby effectively reducing post-sale costs associated with the motor, and improving post-sale efficiency associated with the motor.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to the directions and location relations which are the directions and location relations shown in the drawings. These terms are for convenience of describing the present disclosure and for simplifying description, and are not intended to indicate or imply that the indicated device or the elements are disposed to locate at specific directions or are structured and performed in the specific directions, which could not to be understood to the limitation of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more this feature distinctly or implicitly. In the description of the present disclosure, "a plurality of" means two or more than two, for example, two or three, unless specified otherwise.

In the present disclosure, unless specified or limited otherwise, the terms "mounted," "connected," "coupled" and "fixed" are understood broadly, and may be, for example, fixed connections, detachable connections, or integral connections; and may also be mechanical or electrical mountings, connections and couplings; and may also be direct connections or indirect connections via intervening structures; and may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A programmable motor, comprising:
a main body;
a driving device comprising a reprogramming interface, wherein the reprogramming interface is configured to, in response to performing reprogramming on the programmable motor, communicate with a programming device to receive a motor parameter or a motor software program, to transmit the motor parameter or the motor software program to the driving device, and to update a motor parameter or a motor software program in the driving device;
wherein the reprogramming interface comprises a motor parameter command interface, a software update interface, and a motor power supply interface; and
a first power source, wherein:
an input end of the first power source is connected to an external power source,
a first output end of the first power source is connected to the software update interface and a second output end of the first power source is connected to the motor power supply interface, and
the first power source is configured to convert a voltage of the external power source into a first voltage, to output the first voltage to the software update interface to supply power for the software update interface, to convert the voltage of the external power source into a second voltage, and to output the second voltage to the motor power supply interface to supply power for the programmable motor.

2. The programmable motor according to claim 1, wherein the reprogramming interface is sealed by an insulating material in response to determining that the reprogramming is not performed on the programmable motor.

3. The programmable motor according to claim 1, wherein a voltage of the software update interface is 10 to 30 VDC, and a voltage of the motor power supply interface is greater than or equal to 30V.

4. The programmable motor according to claim 3, wherein the voltage of the software update interface and the voltage of the motor power supply interface are provided by the programming device.

5. The programmable motor according to claim 1, wherein the external power source is an alternating current having a voltage of 208 to 230 V, or 115 V, or 460 V, and having a frequency of 50 or 60 Hz, or the external power source is a direct current having a voltage greater than 30V.

6. The programmable motor according to claim 1, wherein the motor parameter comprises one or more of a motor counter electromotive force, a motor rotational inertia, a motor torque, a motor steering, a motor speed, and a fan delivery.

7. A household appliance comprising the programmable motor according to claim 1.

* * * * *